United States Patent
Yang

(10) Patent No.: US 9,531,616 B2
(45) Date of Patent: Dec. 27, 2016

(54) METHOD AND SYSTEM FOR COUNTING DATA PACKETS

(75) Inventor: Jinmei Yang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 917 days.

(21) Appl. No.: 13/701,218

(22) PCT Filed: Dec. 7, 2010

(86) PCT No.: PCT/CN2010/079500
§ 371 (c)(1),
(2), (4) Date: Dec. 26, 2012

(87) PCT Pub. No.: WO2011/150638
PCT Pub. Date: Dec. 8, 2011

(65) Prior Publication Data
US 2013/0170368 A1    Jul. 4, 2013

(30) Foreign Application Priority Data
Jun. 4, 2010 (CN) .......................... 2010 1 0194647

(51) Int. Cl.
*H04L 12/26* (2006.01)

(52) U.S. Cl.
CPC ....... *H04L 43/0888* (2013.01); *H04L 43/0876* (2013.01)

(58) Field of Classification Search
None
See application file for complete search history.

(56) References Cited

U.S. PATENT DOCUMENTS

| 4,151,403 A | * | 4/1979 | Woolston | ............. | G01B 11/043 242/554 |
| 5,025,414 A | * | 6/1991 | Iwamoto | ............. | G06F 13/4291 710/100 |

(Continued)

FOREIGN PATENT DOCUMENTS

| CN | 1571346 A | 1/2005 |
| CN | 1782924 A | 6/2006 |

(Continued)

OTHER PUBLICATIONS

International Search Report in international application No. PCT/CN2010/079500, mailed on Mar. 17, 2011.

(Continued)

*Primary Examiner* — Jeffrey M Rutkowski
*Assistant Examiner* — Ning Li
(74) *Attorney, Agent, or Firm* — Oppedahl Patent Law Firm LLC

(57) ABSTRACT

The disclosure provides a method for counting data packets, which includes the following steps: counting packet pulse signals when a low bit counter is in a count state, and sending a carry signal when the low bit counter is full; and acquiring data from an address of a Random Access Memory (RAM) corresponding to the low bit counter which sends the carry signal, adding 1 to the acquired data and then writing the added data into the address. The disclosure also provides a system for counting data packets. According to the technical scheme of the disclosure, the occupancy rate of logical resources is reduced while the counting of the data packets in a network is finished at a high speed.

19 Claims, 2 Drawing Sheets

(56) References Cited

U.S. PATENT DOCUMENTS

| | | | | |
|---|---|---|---|---|
| 5,400,187 | A | * | 3/1995 | Van Gestel .......... G11B 15/463 360/48 |
| 5,838,898 | A | * | 11/1998 | Sawai ..................... G06F 11/28 714/50 |
| 6,348,766 | B1 | * | 2/2002 | Ohishi ............... H05B 33/0893 315/185 R |
| 6,434,588 | B1 | * | 8/2002 | Kim ........................ G06F 7/607 708/672 |
| 6,504,876 | B1 | * | 1/2003 | Suto ......................... H03K 3/64 307/106 |
| 6,675,188 | B1 | | 1/2004 | Minami |
| 6,735,669 | B2 | | 5/2004 | Shin |
| 7,391,721 | B1 | * | 6/2008 | Holbrook .............. H03K 21/00 370/229 |
| 7,551,706 | B2 | | 6/2009 | Takagi |
| 2001/0029566 | A1 | | 10/2001 | Shin |
| 2006/0133560 | A1 | | 6/2006 | Takagi |
| 2006/0265526 | A1 | * | 11/2006 | Holbrook ................ H04L 49/90 710/52 |
| 2007/0043531 | A1 | * | 2/2007 | Kosche ............... G06F 11/3447 702/182 |
| 2007/0156995 | A1 | * | 7/2007 | Kaburlasos ......... G06F 13/4243 711/167 |
| 2008/0016415 | A1 | * | 1/2008 | Ide ...................... G06F 11/2215 714/702 |
| 2011/0113190 | A1 | * | 5/2011 | Acharya ................. H04L 69/12 711/108 |

FOREIGN PATENT DOCUMENTS

| | | |
|---|---|---|
| CN | 101079623 A | 11/2007 |
| CN | 101854259 A | 10/2010 |
| EP | 1096369 A2 | 5/2001 |
| JP | 3064111 A | 3/1991 |
| JP | 3064111 U | 9/1999 |

OTHER PUBLICATIONS

English Translation of the Written Opinion of the International Search Authority in international application No. PCT/CN2010/079500, mailed on Mar. 17, 2011.

Supplementary European Search Report in European application No. 10852433.1, mailed on Apr. 30, 2015.

\* cited by examiner

METHOD AND SYSTEM FOR COUNTING DATA PACKETS

TECHNICAL FIELD

The disclosure relates to the network information management technology in the field of a network system, and in particular to a method and system for counting data packets.

BACKGROUND

In a multi-channel network system, in order to clear the fault of a certain channel or to charge data streams in the network system, it is necessary to sort data packets and to calculate, on that basis, the number of each type of data packets transmitted and received in the channel of the network system respectively.

In the conventional art, generally two methods are adopted to calculate the number of data packets in the network system. The first method is to implement by adopting a register, for example, supposing a network system has n channels, each channel has m types of data packets and each type of data packets needs a k-bit counter, since one k-bit register can realize one k-bit binary counter, then it is necessary to occupy at least n*m*k registers to realize the counting of the data packets; moreover, each counter needs to have a reset function; since each counter having the reset function needs a Look-Up-Table (LUT), then n*m*k LUTs are needed, wherein both the register and the LUT belong to logical resources and are used for performing logical operation. The second method is to implement by adopting a Random Access Memory (RAM); when a certain type of data packets arrives at a monitor system of the data packets, and count pulses of the data packets are generated, the monitor system reads out the value of the counter from an address corresponding to the RAM, and adds 1 to the value and then writes the value to the RAM. The first implementation method has an advantage of rapid counting speed, but has a disadvantage of occupying a lot of logical resources when counting a plurality of channels and a plurality of data packets for relatively more counters and LUTs are used. The second implementation method has an advantage of occupying relatively less register resources, but has a disadvantage that the operation speed of the counter cannot meet requirements of the high-speed technology if the count pulses are dense for 3 clock periods are needed to read and write in the RAM.

In the patent application entitled "Method of multi-port received and transmitted packets number statistic in network information exchange" of which the application number is 03132077.5, a method for counting data packets is disclosed, which comprises: using a Field-Programmable Gate Array (FPGA) to make packet buffering and classified counting in a bus switching course; arranging an RAM in the FPGA; especially adopting the RAM in the FPGA to store the classified counting result. This method uses RAM resources to replace trigger resources so as to store the count value of a counter, thus solving the problem of counting overmany triggers consumed and reducing the cost. However, this method has two defects. The first detect is that only RAM is adopted to implement counting; the reading and rewriting of the data in the RAM needs at least 3 clock periods, however, the application scene of this patent requires to be in 96 clock periods, thus the number of data packets needed to be counted cannot exceed 32; otherwise, there is not enough time to process; therefore, this method has great limitations. The second defect is that although this method can count the data packets of a plurality of channels simultaneously, it cannot reset the counter of a single channel, thus if a certain channel needs to restart counting, the entire system has to be reset; therefore, the flexibility of the system is reduced.

SUMMARY

In view of the above, the main purse purpose of the disclosure is to provide a method and system for counting data packets, through which the occupancy rate of logical resources is reduced while the counting of the data packets in a network is finished at a high speed.

In order to achieve the purpose above, the technical scheme of the disclosure is realized as follows.

The disclosure provides a method for counting data packets, which includes:

counting packet pulse signals when a low bit counter is in a count state, and sending a carry signal when the low bit counter is full; and acquiring data from an address of a Random Access Memory (RAM) corresponding to the low bit counter which sends the carry signal, adding 1 to the acquired data and then writing the added data into the address.

In the method, it may further include: before counting packet pulse signals when a low bit counter is in a count state, generating the packet pulse signals according to data packets.

In the method, the generating the packet pulse signals according to data packets may include: receiving, a data channel interface, the data packets transmitted by a data instrument which is connected with the data channel interface, generating various packet pulse signals according to the number of the channel and the type of the data packets, and sending the packet pulse signals to the channel.

In the method, it may further include: resetting data of the low bit counter when the low bit counter is in a reset state; calculating the addresses of the RAMs corresponding is to all low bit counters in the channel, and resetting the data in the addresses.

In the method, the resetting data of the low bit counter when the low bit counter is in a reset state, calculating the addresses of the RAMs corresponding to all low bit counters in the channel and resetting the data in the addresses may include: setting, by the low bit counter, the data of the low bit counter itself to be 0 when the low bit counter is in the reset state; when polling in a polling mode to a channel in which a low bit counter is in the reset state, calculating the addresses of the RAMs corresponding to all low bit counters in the channel according to the number of the channel and the type of the data packets, and sending the addresses to a state machine; setting, by the state machine, the data in the addresses to be 0.

In the method, it may further include: before acquiring data from an address of an RAM corresponding to the low bit counter which sends the carry signal, adding 1 to the acquired data and then writing the added data into the address, when polling in a polling mode to a channel in which the low bit counter providing the carry signal is located, calculating the address of the RAM corresponding to the low bit counter according to the number of the channel and the type of the data packets, and forwarding the calculated RAM address to a state machine.

In the method, the counting packet pulse signals when a low bit counter is in a count state, and sending a carry signal when the low bit counter is full may include: each low bit counter in the channel identifying the packet pulse signals counted by itself according to a packet header and counting the packet pulse signals of itself, and sending the carry signal used for sending a carry request when the low bit counter is full.

In the method, the acquiring data from the address of the RAM corresponding to the low bit counter which sends the carry signal, and adding 1 to the data and then writing the data into the address may include: after receiving the address of the RAM, sending, by a state machine, a write enabling pulse signal to the RAM; when a rising edge of a next clock comes, outputting, by the RAM, the data stored in the address of the RAM itself to the state machine; adding, the state machine, 1 to the data and then sending the added data to the RAM to store; after finishing the carry work, resetting, by the state machine, the state of the state machine itself to be a read and write RAM complete state.

In the method, it may further include: after adding 1 to the data and then writing the added data into the address, clearing a carry signal of the low bit counter.

In the method, the clearing a carry signal of the low bit counter may include: after resetting its state to be a read and write RAM complete state, triggering, by the state machine, a carry clear module to start working; generating, by the carry clear module, a carry clear pulse according to the number of the channel and the type of the data packet corresponding to the low bit counter which sends the carry signal, and sending the carry clear pulse to the state machine; clearing, by the state machine, the carry signal of the low bit counter which generates the carry signal.

The disclosure also provides a system for counting data packets, which includes: a low bit counter, a state machine and a Random Access Memory (RAM), wherein the low bit counter is configured to count packet pulse signals when the low bit counter itself is in a count state and to send a carry signal when the low bit counter itself is full;

the state machine is configured to acquire data from an address of the RAM corresponding to the low bit counter which sends the carry signal, to add 1 to the acquired data and then to write the added data into the address; and the RAM is configured to provide the data of itself to the state machine and to store the data written by the state machine.

In the system, it may further include: at least one of a data channel interface, a polling algorithm module and a carry clear module; wherein the data channel interface is configured to generate the packet pulse signals according to data packets; the polling algorithm module is configured to poll channels, to trigger an address arithmetic module when polling to a channel in which the low bit counter is in a reset state or provides a carry signal; wherein the address arithmetic module is configured to calculate, when triggered by the polling algorithm module, the address of the RAM corresponding to the low bit counter according to the number of the channel and the type of the data packets and to send the address to the state machine; the carry clear module is configured to generate, when triggered by the state machine, a carry clear pulse according to the number of the channel and the type of the data packet corresponding to the low bit counter which sends the carry signal, and to send the carry clear pulse to the state machine.

In the system, the low bit counter may be further configured to reset data of itself when being in a reset state; and the state machine may be further configured to reset the data in the address of the RAM sent from the address arithmetic module.

In the method and system provided by the disclosure for counting data packets, a counter counts packet pulse signals and sends a carry signal when the counter is full, and 1 is added to the data in the address of an RAM corresponding to the counter which sends the carry signal; the method of combining register and RAM to count the data packets in a network achieves a rapid calculation speed so that the calculation speed is close to the calculation speed implemented by using registers only, meanwhile the occupancy rate of logical resource is reduced; compared with the method of adopting registers to count only, this method stores lots of logical resources; moreover, the counter of a certain channel can be reset without impacting the counting of other channels, thus the flexibility of system is improved.

DETAILED DESCRIPTION

The basic concept of the disclosure is: counting packet pulse signals when a low bit counter is in a count state, and sending a carry signal when the low bit counter is full; and acquiring data from an address of an RAM corresponding to the low bit counter which sends the carry signal, adding 1 to the acquired data and then writing the added data into the address.

The disclosure is described below in further detail through the drawings and specific embodiments.

Figure 1:
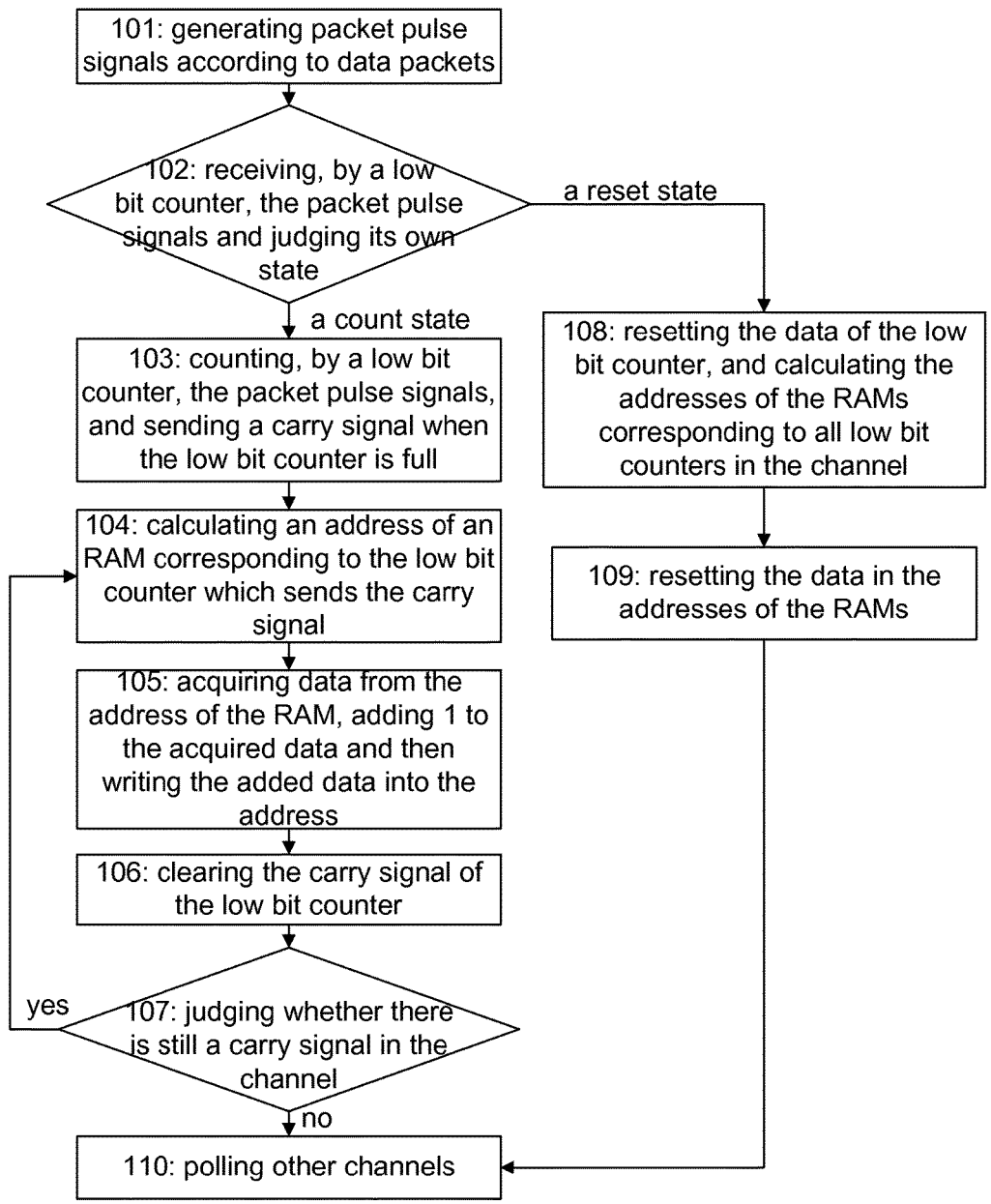
FIG. 1 shows a flowchart of a method for counting data packets implemented in the disclosure.

The disclosure provides a method for counting data packets. FIG. 1 shows a flowchart of a method for counting data packets implemented in the disclosure; as shown FIG. 1, the method includes the following steps.

Step 101: generating packet pulse signals according to data packets.

Specifically, at one side, a data channel interface is connected with a data instrument which has the function of receiving and transmitting data packets, and receives the data packets transmitted from the data instrument; at the other side, the data channel interface is connected with a plurality of channels, wherein there are several types of data packets in each channel; each type of data packets in each channel is provided with a binary counter for counting; the data channel interface generates various packet pulse signals according to the number of the channel and the type of the data packets, and sends the packet pulse signal to the corresponding channel.

Step 102: receiving, by a low bit counter, the packet pulse signals and judging its own state; if its state is a count state, executing step 103; if its state is a reset state, executing step 108.

Specifically, there are n channels; each channel has m types of data packets; each data packet needs a k-bit binary counter to count; $n*m$ i-bit registers serve as the low i-bit counter of the k-bit binary counter and are called low bit counters; RAM with bit width of j and depth of $n*m$ serves as the high j-bit counter of the k-bit binary counter, and $i+j=k$, wherein the address of each RAM corresponds to one low i-bit counter; the value of i is determined according to the quantity of the channels and the type of the data packets; when the quantity of the channels is relatively larger or the type of the data packets is relatively more, the value of i might get greater; in this way, the frequency of the low i-bit counter sending a carry signal is reduced, and there is enough time to process the carry signal; if the quantity of the channels is relatively smaller or the type of the data packets is relatively less, the value of i might get less; both the low i-bit counter and the RAM are connected with a Central Processing Unit (CPU) of a switch through an information interaction interface, so that the data of the low bit counter and the data of the RAM can be read conveniently.

The CPU configures the state of the low bit counter through the information interaction interface, wherein there is a plurality of registers in the information interaction interface and each register corresponds to all low bit counters in one channel; the CPU sets the value of each register according to current requirements, for example, when it is needed to count the data packets in a certain channel included in the packet pulse signals, the CPU sets the value of the register to be 1, indicating that all low bit counters corresponding to the register are in the count state; when all the data packets included in the packet pulse signals are counted, the CPU can read the data of the low bit counter and the data of the RAM; after finishing reading the data, the CPU can reset the low bit counter and the RAM, so that the low bit counter and the RAM can continue counting; at this moment, the value of the register is set to be 0, indicating that the low bit counters are in the reset state; the low bit counter in the channel receives the packet pulse signal sent from the data channel interface, and the low bit counter judges its own state by reading the value of the corresponding register in the information interaction interface; if the low bit counter is in the count state, step 103 is executed; if the low bit counter is in the reset state, step 108 is executed.

Step 103: counting, by the low bit counter, the packet pulse signals, and sending a carry signal when the low bit counter is full.

Specifically, the low i-bit counter of each k-bit binary counter in the channel identifies the packet pulse signals counted by itself according to a packet header, and counts the packet pulse signals of itself; when the low bit counter is full and sends a carry signal, the value of a trigger in an FPGA can be set to be 1, indicating that the carry signal is is valid, wherein sending a carry signal is equivalent to sending a carry request to a polling algorithm module; the sent carry signal also can trigger a state machine to be ready to work, for example, supposing a low 4-bit counter of a k-bit binary counter counts the packet pulse signals, when the value of the low 4-bit counter is 1111, if there is another packet pulse signal, the value of the counter would be added with 1 and become 0000, indicating that the low 4-bit counter is full at this moment, then a carry signal is sent out; at this moment, the counter is added with 1 and then becomes 0000, that is, count starting from 0 is automatically implemented after the carry is performed, thus step 102 can be executed.

Step 104: calculating an address of an RAM corresponding to the low bit counter which sends the carry signal.

Specifically, the polling algorithm module polls all channels and judges whether each low bit counter in the channel sends a carry signal; when judging that the low bit counter corresponding to a certain type of data packets in a certain channel sends a carry signal, the polling algorithm module temporarily stays at this channel and triggers an address arithmetic module, wherein the address arithmetic module calculates the address of the RAM corresponding to the low bit counter according to the number of the channel and the type of the data packets, and sends the calculated RAM address to a state machine, for example, supposing there are 8 channels, each channel has 16 types of data packets, and the carry signal of the fifth type of data packets of the second channel is 1, then the RAM address calculated by the address arithmetic module is a binary number 01100, wherein the former two bits 01 indicates the second channel, and the latter three bits 100 indicates the fifth type of data packets.

Step 105: acquiring data from the address of the RAM, adding 1 to the acquired data and then writing the added data into the address.

Specifically, after receiving the address of the RAM sent from the address arithmetic module, the state machine sends a write enabling pulse signal to the RAM; after receiving the write enabling pulse signal, the RAM outputs the data stored in the address corresponding to the RAM itself to the state machine when the rising edge of a next clock comes; the state machine adds 1 to the data, and sends the data added with 1 to the RAM when the rising edge of a next clock comes; then the RAM stores the data added with 1 in the corresponding address; after finishing the carry work, the state machine resets its state to be a read and write RAM complete state.

Step 106: clearing the carry signal of the low bit counter.

Specifically, after the state machine resets its state to be a read and write RAM complete state, it triggers a carry clear module to start working; the carry clear module generates a carry clear pulse according to the number of the channel and the type of the data packet corresponding to the low bit counter which sends the carry signal, and sends the carry clear pulse to the state machine; when receiving the carry clear pulse sent from the carry clear module, the state machine clears the carry signal of the low bit counter which generates the carry signal, that is, modifying the value of the trigger implementing the carry signal from 1 to 0.

Step 107: judging whether there is still a carry signal in the channel; if so, executing step 104; otherwise, executing step 110.

Specifically, the polling algorithm module judges whether there is still a carry signal in the channel in which the polling algorithm module is located; if so, step 104 is executed; otherwise, step 110 is executed.

Step 108: resetting the data of the low bit counter, and calculating the addresses of the RAMs corresponding to all low bit counters in the channel.

Specifically, when the low bit counter is in the reset state, the value of the trigger in the FPGA is set to be 1; meanwhile the data of the low bit counter itself is set to be 0; the polling algorithm module polls all channels, and judges whether there is a low bit counter in the reset state in the channel according to the value of the trigger; if so, the polling algorithm module temporarily stays at this channel and triggers the address arithmetic module, then the address arithmetic module calculates the addresses of the RAMs corresponding to all low bit counters in the channel according to the number of the channel and the type of the data packets, and sends the calculated RAM addresses to the state machine.

Step 109: resetting the data in the addresses of the RAMs.

Specifically, the state machine receives the addresses of the RAMs corresponding to all low bit counters in the channel sent from the address arithmetic module; since the address of the RAM is a binary number, then the state machine reads the data in the RAM addresses based on an ascending order of RAM addresses in turn, and then sets the data to be 0.

Step 110: polling other channels.

Specifically, after the carry request in a certain channel is processed, or after the data in all low bit counters and RAMs in a certain channel are reset, the polling algorithm module continues polling other channels, wherein adopting the method of polling all channels by using the polling algorithm module, instead of adopting the method of processing according to the priority set to the channel, can avoid the condition that the channel with the lowest priority cannot be processed in time when the low bit counters in several channels send a carry signal simultaneously.

Figure 2:
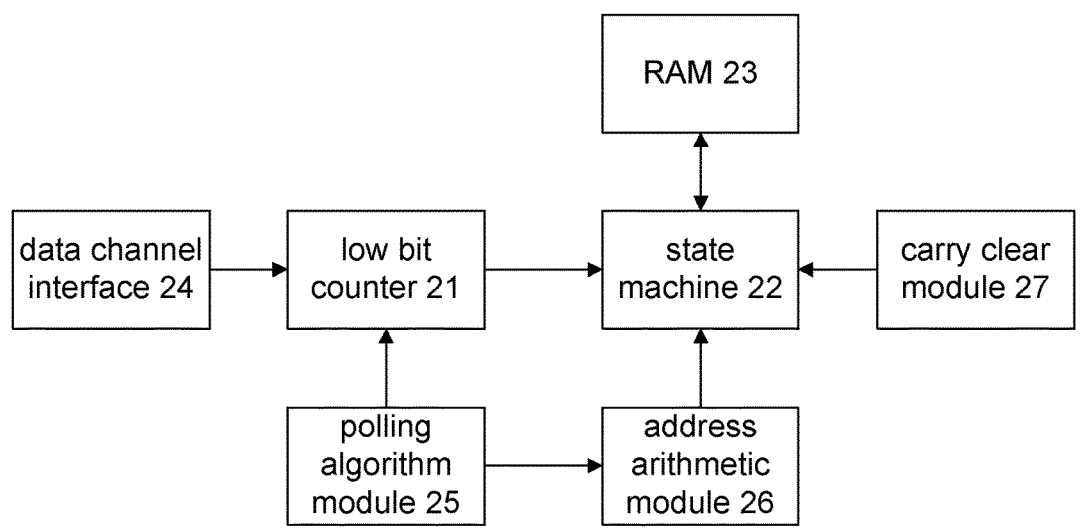
FIG. 2 shows a structure diagram of a system for counting data packets implemented in the disclosure.

In order to implement the method above, the disclosure also provides a system for counting data packets; FIG. 2 shows a structure diagram of a system for counting data packets implemented in the disclosure; as shown in FIG. 2, the system includes: a low bit counter 21, a state machine 22 and an RAM 23, wherein the low bit counter 21 is configured to count packet pulse signals when the low bit counter itself is in a count state and to send a carry signal when the low bit counter itself is full;

the low bit counter 21 is further configured to reset data of itself when being in a reset state;

the state machine 22 is configured to acquire data from an address of the RAM 23 corresponding to the low bit counter 21 which sends the carry signal, to add 1 to the acquired data and then to write the added data into the address;

the state machine 22 is further configured to reset the data in the address of the RAM sent from an address arithmetic module 26;

wherein the state machine 22 acquiring data from an address of the RAM corresponding to the low bit counter 21 which sends the carry signal, adding 1 to the acquired data and then writing the added data into the address specifically includes that: after receiving the address of the RAM 23 sent from the address arithmetic module 26, the state machine 22 sends a write enabling pulse signal to the RAM 23; when the rising edge of a next clock comes, the RAM 23 outputs the data stored in the address of the RAM 23 itself to the state machine 22; the state machine 22 adds 1 to the data and then sends the added data to the RAM 23 to store; after finishing the carry work, the state machine 22 resets its state to be a read and write RAM complete state, and triggers a carry clear module 27 to start working;

the RAM 23 is configured to provide the data of itself to the state machine 22 and to store the data written by the state machine 22.

The system can further include: a data channel interface 24;

the data channel interface 24 is configured to generate the packet pulse signals according to data packets;

wherein the data channel interface 24 generating the packet pulse signals according to data packets specifically includes that: the data channel interface 24 receives the data packets transmitted by a data instrument which is connected with the data channel interface 24, generates various packet pulse signals according to the number of the channel and the type of the data packets, and sends the packet pulse signals to the channel.

The system can further include: a polling algorithm module 25 and an address arithmetic module 26, wherein the polling algorithm module 25 is configured to poll channels, and to trigger the address arithmetic module 26 when polling to a channel in which the low bit counter 21 is in the reset state or provides a carry signal;

the address arithmetic module 26 is configured to calculate, when triggered by the polling algorithm module 25, the address of the RAM 23 corresponding to the low bit counter 21 according to the number of the channel and the type of the data packets and to send the address to the state machine 22.

The system can further include: a carry clear module 27;

the carry clear module 27 is configured to generate, when triggered by the state machine 22, a carry clear pulse according to the number of the channel and the type of the data packet corresponding to the low bit counter 21 which sends the carry signal, and to send the carry clear pulse to the state machine 22.

The above are only the preferred embodiments of the disclosure and are not intended to limit the scope of protection of the disclosure. Any modification, equivalent substitute and improvement made within the spirit and principle of the disclosure are deemed to be included within the scope of protection of the disclosure.

What is claimed is:

1. A method for counting data packets, comprising:
counting packet pulse signals when a low bit counter is in a count state, sending a carry signal when the low bit counter is full;
polling all channels and determining a channel in which the low bit counter sends the carry signal, calculating an address of a Random Access Memory (RAM) corresponding to the low bit counter according to a channel number of the channel and a type of the data packets in the channel, and forwarding the calculated RAM address to a state machine;
acquiring, by the state machine, data from the address of the RAM corresponding to the low bit counter adding 1 to the acquired data and writing the added data into the address,
a counting speed for the data packets is increased by combining the low bit counter and the RAM.

2. The method according to claim 1, further comprising:
before the counting packet pulse signals when the low bit counter is in the count state, generating the packet pulse signals according to the data packets.

3. The method according to claim 2, wherein the generating the packet pulse signals according to the data packets comprises:
receiving, by a data channel interface, the data packets transmitted by a data instrument which is connected with the data channel interface, generating various packet pulse signals according to the channel number of the channel and the type of the data packets, and sending the packet pulse signals to the channel.

4. The method according to claim 3, wherein the acquiring data from the address of the RAM corresponding to the low bit counter which sends the carry signal, and adding 1 to the data and writing the data into the address comprises:
receiving, by the state machine, the address of the RAM;
after receiving the address of the RAM, sending, by the state machine, a write enabling pulse signal to the RAM; when a rising edge of a next clock comes, outputting, by the RAM, the data stored in the address of the RAM to the state machine; adding, by the state machine, 1 to the data and sending the added data to the RAM to store; and resetting, by the state machine, the state of the state machine to be a read and write RAM complete state.

5. The method according to claim 2, wherein the acquiring data from the address of the RAM corresponding to the low bit counter which sends the carry signal, and adding 1 to the data and writing the data into the address comprises:
receiving, by the state machine, the address of the RAM;
after receiving the address of the RAM, sending, by the state machine, a write enabling pulse signal to the RAM; when a rising edge of a next clock comes, outputting, by the RAM, the data stored in the address of the RAM to the state machine; adding, by the state machine, 1 to the data and sending the added data to the RAM to store; and resetting, by the state machine, the state of the state machine to be a read and write RAM complete state.

6. The method according to claim 2, further comprising: after adding 1 to the data and then writing the added data into the address, clearing the carry signal of the low bit counter.

7. The method according to claim 1, further comprising: resetting data of the low bit counter when the low bit counter is in a reset state; calculating addresses of RAMs corresponding to all low bit counters in the channel in which the low bit counter is in the reset state, and resetting data in the addresses.

8. The method according to claim 7, wherein the resetting data of the low bit counter when the low bit counter is in the reset state, calculating the addresses of RAMs corresponding to all low bit counters in the channel in which the low bit counter is in the reset state and resetting the data in the addresses comprising:
setting, by the low bit counter, the data of the low bit counter itself to be 0 when the low bit counter is in the reset state; polling all channels and determining the channel in which the low bit counter is in the reset state, calculating the addresses of the RAMs corresponding to all low bit counters in the channel, and sending the addresses to the state machine; setting, by the state machine, the data in the addresses to be 0.

9. The method according to claim 8, wherein the acquiring data from the address of the RAM corresponding to the low bit counter which sends the carry signal, and adding 1 to the data and writing the data into the address comprises:
receiving, by the state machine, the address of the RAM; after receiving the address of the RAM, sending, by the state machine, a write enabling pulse signal to the RAM; when a rising edge of a next clock comes, outputting, by the RAM, the data stored in the address of the RAM to the state machine; adding, by the state machine, 1 to the data and sending the added data to the RAM to store; and resetting, by the state machine, the state of the state machine to be a read and write RAM complete state.

10. The method according to claim 7, wherein the acquiring data from the address of the RAM corresponding to the low bit counter which sends the carry signal, and adding 1 to the data and writing the data into the address comprises:
receiving, by the state machine, the address of the RAM; after receiving the address of the RAM, sending, by the state machine, a write enabling pulse signal to the RAM; when a rising edge of a next clock comes, outputting, by the RAM, the data stored in the address of the RAM to the state machine; adding, by the state machine, 1 to the data and sending the added data to the RAM to store; and resetting, by the state machine, the state of the state machine to be a read and write RAM complete state.

11. The method according to claim 1, wherein the counting packet pulse signals when the low bit counter is in the count state, and sending the carry signal when the low bit counter is full comprises:
identifying, by the low bit counter in the channel, the packet pulse signals according to a packet header, counting the packet pulse signals, and sending the carry signal used for sending a carry request when the low bit counter is full.

12. The method according to claim 11, wherein the acquiring data from the address of the RAM corresponding to the low bit counter which sends the carry signal, and adding 1 to the data and writing the data into the address comprises:
receiving, by the state machine, the address of the RAM; after receiving the address of the RAM, sending, by the state machine, a write enabling pulse signal to the RAM; when a rising edge of a next clock comes, outputting, by the RAM, the data stored in the address of the RAM to the state machine; adding, by the state machine, 1 to the data and sending the added data to the RAM to store; and resetting, by the state machine, the state of the state machine to be a read and write RAM complete state.

13. The method according to claim 1, wherein the acquiring data from the address of the RAM corresponding to the low bit counter which sends the carry signal, and adding 1 to the data and writing the data into the address comprises:
receiving, by the state machine, the address of the RAM; after receiving the address of the RAM, sending, by the state machine, a write enabling pulse signal to the RAM; when a rising edge of a next clock comes, outputting, by the RAM, the data stored in the address of the RAM to the state machine; adding, by the state machine, 1 to the data and sending the added data to the RAM to store; and resetting, by the state machine, the state of the state machine to be a read and write RAM complete state.

14. The method according to claim 1, further comprising: after adding 1 to the data and then writing the added data into the address, clearing the carry signal of the low bit counter.

15. The method according to claim 14, wherein the clearing the carry signal of the low bit counter comprises:
resetting, by the state machine, a state of the state machine to be a read and write RAM complete state after adding 1 to the data and sending added data to the RAM to store;
after resetting the state of the state machine to be a read and write RAM complete state, triggering a carry clear circuitry to generate a carry clear pulse according to the channel number of the channel and the type of the data packets in the channel, and sending the carry clear pulse to the state machine; clearing, by the state machine, the carry signal of the low bit counter which generates the carry signal.

16. The method according to claim 1, wherein the acquiring data from the address of the RAM corresponding to the low bit counter which sends the carry signal, and adding 1 to the data and writing the data into the address comprises:
receiving, by the state machine, the address of the RAM; after receiving the address of the RAM, sending, by the state machine, a write enabling pulse signal to the RAM; when a rising edge of a next clock comes, outputting, by the RAM, the data stored in the address of the RAM to the state machine; adding, by the state machine, 1 to the data and sending the added data to the RAM to store; and resetting, by the state machine, the state of the state machine to be a read and write RAM complete state.

17. A system for counting data packets, comprising: a low bit counter, a state machine, a Random Access Memory (RAM), a polling algorithm circuitry, and an address arithmetic circuitry, wherein the low bit counter is configured to count packet pulse signals when the low bit counter is in a count state and to send a carry signal when the low bit counter is full;

the polling algorithm circuitry is configured to poll channels, trigger the address arithmetic circuitry when polling to a channel in which the low bit counter is sending the carry signal;

wherein the address arithmetic circuitry is configured to calculate an address of the RAM corresponding to the low bit counter according to a channel number of the channel and a type of the data packets in the channel and to send the address of the RAM to the state machine;

the state machine is configured to acquire data from the address of the RAM corresponding to the low bit counter which sends the carry signal, to add 1 to the acquired data and to write the added data into the address; and the RAM is configured to provide the data to the state machine and to store the data written by the state machine, a counting speed for the data packets is increased by combining the low bit counter and the RAM.

18. The system according to claim 17, further comprising a data channel interface and a carry clear circuitry; wherein the data channel interface generates the packet pulse signals according to the data packets;

when the low bit counter is in a reset state, the state machine triggers the carry clear circuitry to generate a carry clear pulse according to the channel number of the channel and the type of the data packets in the channel; and send the carry clear pulse to the state machine.

19. The system according to claim 18, wherein the low bit counter resets data of itself when being in the reset state;

the state machine receives the address of the RAM sent from the address arithmetic circuitry, and resets the data in the address of the RAM sent from the address arithmetic circuitry.

* * * * *